June 5, 1962 H. BEMMANN 3,037,719
ROLL FILM CARTRIDGES
Filed March 11, 1960 2 Sheets-Sheet 1

June 5, 1962  H. BEMMANN  3,037,719
ROLL FILM CARTRIDGES
Filed March 11, 1960  2 Sheets-Sheet 2
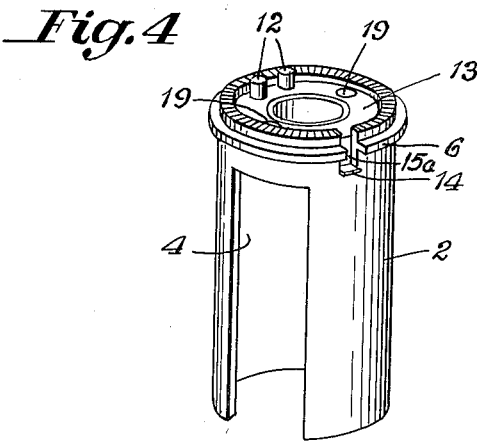
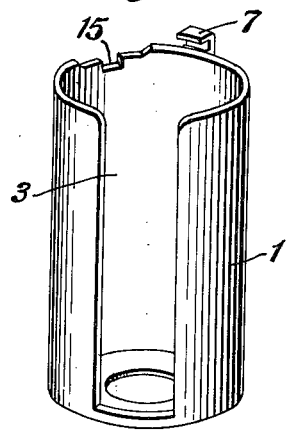
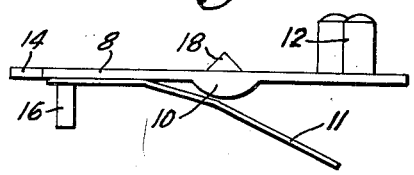
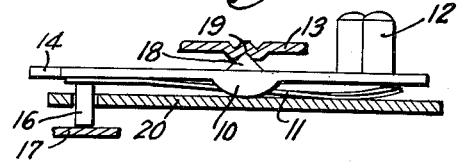
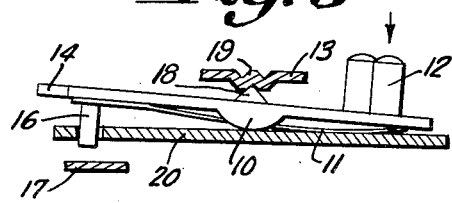

3,037,719
ROLL FILM CARTRIDGES
Heinz Bemmann, Stuttgart, Germany, assignor to Zeiss Ikon Aktiengesellschaft, Stuttgart-S, Germany
Filed Mar. 11, 1960, Ser. No. 14,429
Claims priority, application Germany Mar. 14, 1959
3 Claims. (Cl. 242—71.1)

The present invention relates to a roll film cartridge consisting of two cylindrical shells which are each provided with a film passage slot, and which are rotatable in opposite directions relative to each other, said cartridge being opened and closed by film conveying members provided on the camera.

Different types of film cartridges are known in which one cartridge receives the unexposed portion of the film while the second cartridge receives the exposed portion of the film. The use of these types of cartridges eliminates the necessity of rewinding the exposed film upon the film supply spool which is necessary when conventional film cartridges are used.

When the two cartridges are removed from the camera, the free film portion between the same is also removed from the camera. The cartridges can be inserted again in unchanged position into the camera when the film is to be used for additional exposures. Of course, the portion of the film between the cartridges was exposed to light and is spoiled and cannot be used for additional exposures, but only that portion which remained inside one of the cartridges can be used for additional exposures.

In accordance with one object of the invention the film portions which are spooled in the two cartridges are completely protected against light by suitable light-tight seals.

Another object of this invention is to provide an automatically releasable brake in the roll film cartridges which will normally prevent a rotation of the film spool in the cartridge. Such a releasable brake is of particular advantage because, after the cartridge is inserted into the camera and is coupled with the film operating members of the camera, the brake will be automatically released so that the spool can easily be rotated by the film operating members of the camera.

A still further advantage of the present invention is the arrangement of the brake device in such a manner that, after the cartridge is closed which is effected, for instance, by operating corresponding control members of the camera which cooperate with elements of the cartridge before the rear wall of the camera can be opened, said brake will become effective and will prevent a rotation of the film spool in the cartridge.

Further objects and advantages of the invention will readily become apparent upon reading the following specification, taken in conjunction with the accompanying drawing, in which:

FIG. 4 is a perspective view of the inner shell of the cartridge, and

FIG. 5 is a perspective view of the outer shell of the cartridge.

FIG. 6 shows the closure ring of the cartridge with a spring and pins attached thereto, FIG. 7 illustrates the operation of the spring on the closure ring when inserted into the cartridge, and FIG. 8 illustrates the tilting movement of the closure ring when the pins thereon are subjected to downward pressure.

Figure 1:
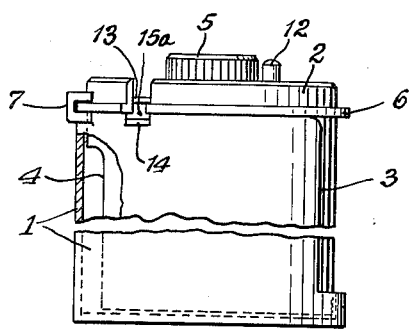
FIG. 1 shows a view of the closed cartridge.
Figure 2:
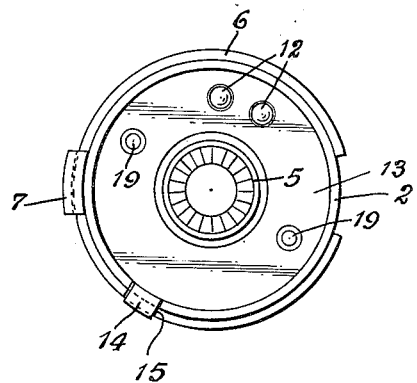
FIG. 2 shows a plan view of the front face of the cartridge which receives the closing members.

Referring to the drawing and more particularly to FIG. 1, the roll film cartridge of the invention comprises two cylindrical shells 1 and 2 which are inserted one into the other and are provided each with a slot 3 and 4 respectively for the passage of the film. These cylindrical shells 1 and 2 can be rotated relatively to each other in such a manner that their film passage slots 3 and 4 will be disposed one above the other when the cartridge is in its open position, so that a film strip in the cartridge which, for instance, is wound upon a film spool 5 will be able to pass through the thus provided opening and may be moved into the picture window camera. Before the cartridge is removed from the camera, both shells 1 and 2 are rotated relative to each other until the two film passage slots 3 and 4 are positioned diametrically opposite each other on the circumference of the cartridge (FIG. 1). The superposed walls of the shells 1 and 2 will thus form a light-tight guide chanenl for the film wound into the cartridge or to be wound into the cartridge, respectively. The cartridge can be thus removed at any time from the camera without exposing the film strip in the cartridge to the ambient light.

Figure 3:
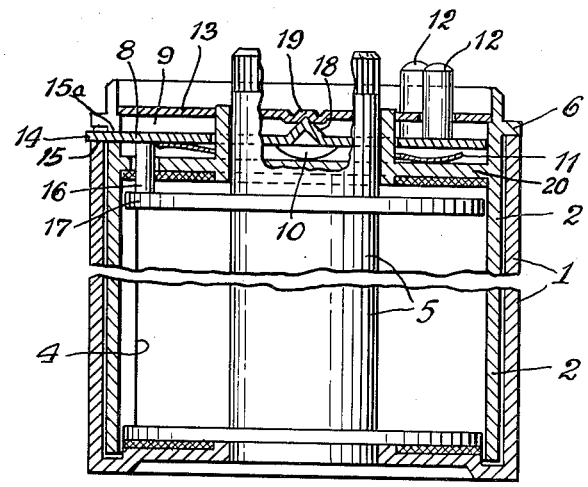
FIG. 3 shows a longitudinal section of the cartridge.

In order to assure this closed position of the cartridge, the inner shell 2 is provided with a circumferentially extending projecting flange 6 near its outer end. This flange 6 engages a U-shaped guide portion 7 on the outer shell 1, thereby securing said inner shell 2 against axial displacement. Furthermore, a closure ring 8 is arranged on the inner shell 2. The closure ring 8 is disposed in an annular chamber 9 at the outer end of the inner shell 2 and is tiltably supported on the bottom wall 20 of the chamber 9 by two rectangularly bent projections 10. An annular leaf spring 11 which is placed between said closure ring 8 and the bottom wall 20 of the annular chamber 9 tends to tilt said closure ring 8 about the support formed by said projections 10 in such a manner that the pressure pins 12, which are fastened to the closure ring 8, will project as far as possible from a plate 13 which closes the upper end of the inner shell 2. This closure plate 13 has holes for the passage of the pins 12 and is also used to arrest the projections 10 on the ring 8, which, as shown in FIG. 3, engages with upwardly directed conical apexes 18 correspondingly formed depressions 19 in the plate 13.

This operation of the annular leaf spring 11 is illustrated more clearly in connection with the FIGS. 6 and 7 of which FIG. 6 illustrates the closure ring 8 with the leaf spring 11 thereon before insertion into the annular chamber 9. The leaf spring 11 is attached to the lower side of the ring 8 by a cam 16 the purpose of which will be described hereinafter. When the ring 8 is inserted into the annular chamber 9, it will rest with its two projections 10 on the bottom wall 20. Upon the arrangement of the closure plate 13 the depressions 19 thereof receive the apexes of the ring 8 as shown in FIG. 7. Therefore, the ring 8 is able to tilt only about its two projections 10 and since the left hand portion of the spring 11 is attached to the left hand portion of the ring 8 and the right hand portion of the spring 11 engages the wall 20 to the right of the projections, it follows that the spring 11 tends to tilt the ring 8 in anti-clockwise direction about the two projections.

A radially outwardly projecting nose portion 14 on the closure ring 8 projects through a slot 15a in the inner shell 2 and engages the wall of a recess 15 in the wall of the outer shell 1 of the cartridge in the closed position of the latter under the action of said spring 11. This will secure the two shells 1 and 2 of the cartridge in their closed position against any displacement in axial direction, or against rotation in the two possible directions.

When the cartridge is inserted in the camera, the pressure pins 12 arranged on said closure ring 8 will come into contact with the control members of the camera and will be pressed a certain amount into the annular chamber 9 formed at one end of the inner shell 2 against the action of the spring 11 as illustrated in FIG. 8.

The tilting movement of the closure ring 8 around its projections 10 caused by the non-symmetrical arrangement of the pins 12 will lift the nose portion 14 from the recess 15 on the outer shell 1. This will permit by means of the control members of the camera which, for instance, engage the pins 12 a rotation of the inner shell 2 with respect to the outer shell 1 to a position in which the two film passage slots 3 and 4 will be in registration with each other so that the cartridge is fully opened.

A brake cam 16 is provided on the closure ring 8 of the cartridge and is positioned in the vicinity of said nose portion 14. This cam 16 may also be used as a connecting member between the closure ring 8 and the leaf spring 11, and the cam 16 is usually urged by the spring 11 against the end flange 17 of the film spool 5 in the cartridge. The cam 16, therefore, prevents an independent rotary movement of the film spool 5 which could, for instance, take place when the film wound on said spool tries to unwind. The film spool 5 will thus securely be held in its position inside of the cartridge by said brake cam 16, even when the spool is not in an operative connection with the control members of the camera, i.e. when the cartridge is removed from the camera. When the cartridge is inserted into the camera, the film spool 5 will be coupled with the corresponding film operating member of the camera in a manner which is conventional and, therefore, need not be described in detail. It is, however, advantageous, after the cartridge has been inserted in the camera, to remove the now superfluous braking action of the cam 16 from the film spool flange 17 and to permit an unrestrained advance of the film by the corresponding film advance means of the camera. For this purpose the braking cam 16 is raised from the end flange 17 of the spool when the cartridge is inserted in the camera. This is effected by an engagement of the ends of said pins 12 with the control members of the camera so that the closure ring 8 is tilted about its bearing projections 10 against the action of the spring 11 and will thus lift the nose 14 and that portion of the ring 8 which carries the brake cam 16. The film spool 5 can now be easily rotated by the film conveying members of the camera.

What I claim is:

1. A roll film cartridge for use in a camera comprising an inner cylindrical shell and an outer cylindrical shell provided each with a film passage slot and adapted to be rotated in opposite directions relative to each other to move said slots into and out of registration, a releasable brake means arranged to engage a film spool inserted into said cartridge, a closure member movably mounted on one end of said cartridge and adapted to be engaged and moved by an operating member on the camera, said brake means being fixed to said closure member and upon engagement of said an operating member with said closure member being released from braking engagement with said film spool.

2. A roll film cartridge for use in a camera comprising an inner cylindrical shell and an outer cylindrical shell provided each with a film passage slot and adapted to be rotated in opposite directions relative to each other to move said slots into and out of registration, a releasable brake means arranged to engage a film spool inserted into said cartridge, a closure ring on one end of said cartridge adapted to be operatively connected with an operating member on the camera, said brake means including a cam fixed to said closure ring, said closure ring being mounted on the outer end of said inner shell, a spring tending to move said closure ring and the cam thereon inwardly means for tiltably supporting said closure ring so that said spring is adapted to tilt said closure ring so as to urge said cam on said closure ring against an end flange of the film spool in said cartridge when said cartridge is closed.

3. A roll film cartridge for use in a camera comprising an inner cylindrical shell and an outer cylindrical shell provided each with a film passage slot and adapted to be rotated in opposite directions relative to each other to move said slots into and out of registration, a releasable brake means arranged to engage a film spool inserted into said cartridge, a closure ring on one end of said cartridge adapted to be operatively connected with an operating member on the camera, said brake means including a cam fixed to said closure ring, said closure ring being mounted on the outer end of said inner shell, a spring tending to move said closure ring and the cam thereon inwardly means for tiltably supporting said closure ring so that said spring is adapted to tilt said closure ring so as to urge said cam on said closure ring against an end flange of the film spool in said cartridge when said cartridge is closed, and a detent nose on the circumference of said closure ring arranged in the vicinity of said brake means and adapted to lock said cylindrical shells against rotative movement with respect to each other in the closed position of said cartridge.

References Cited in the file of this patent

UNITED STATES PATENTS

| 1,469,485 | Rivetta | Oct. 2, 1923 |
| 2,511,383 | Summers | June 13, 1950 |

FOREIGN PATENTS

| 662,407 | Great Britain | Dec. 5, 1951 |